E. J. MORAN.
PUNCTUREPROOF TIRE.
APPLICATION FILED OCT. 19, 1921.

1,416,049.

Patented May 16, 1922.

Inventor:
Edward J. Moran,
By Chamberlin & Brendenreich
Attys.

UNITED STATES PATENT OFFICE.

EDWARD J. MORAN, OF CHICAGO, ILLINOIS.

PUNCTUREPROOF TIRE.

1,416,049.  Specification of Letters Patent.  Patented May 16, 1922.

Application filed October 19, 1921. Serial No. 508,642.

*To all whom it may concern:*

Be it known that I, EDWARD J. MORAN, a citizen of the United States, residing at Chicago, county of Cook, State of Illinois, have invented a certain new and useful Improvement in Punctureproof Tires, and declare the following to be a full, clear, and exact description of the same, such as will enable others skilled in the art to which it pertains to make and use the same, reference being had to the accompanying drawings, which form a part of this specification.

My invention has for its object to produce a simple and novel construction and arrangement which will prevent pneumatic tires from being punctured.

My improvements may be incorporated directly in the casing or shoe of a pneumatic tire and therefore, viewed in one of its aspects, my invention may be said to have for its object to produce a simple and novel tire which will be puncture-proof.

In carrying out my invention I make use of a large number of small sheets or plates of metal or other suitable material overlapping each other and imbedded in a body of rubber. This rubber may conveniently be continued over the entire inner wall of the casing so that the casing presents a rubber surface for contact with the usual inner tube. Therefore, viewed in one of its aspects, my invention may be said to have for its object to produce a simple and durable tire casing presenting an inner surface of rubber.

Reinforcing plates have heretofore been used in liners and in the body of a tire but difficulty has been experienced therewith on account of a breaking of the plates under the continued flexing thereof. One of the objects of the present invention is to produce a simple and novel arrangement of reinforcing plates which will permit the usual amount of flexing of a tire when in service without danger of ultimately breaking the plates.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1:
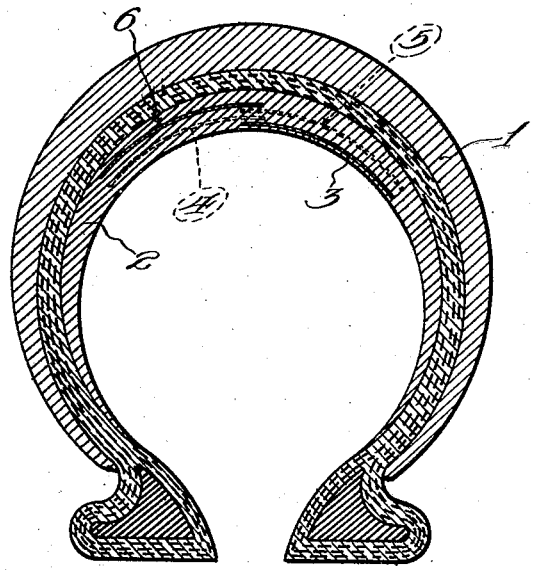
Figure 1 is a cross section through the casing of a pneumatic tire embodying the present invention.
Figure 2:
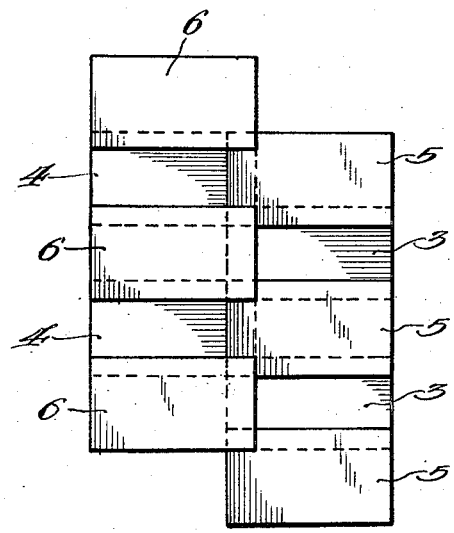
Fig. 2 is a plan view of a section of the reinforcing plates in the positions which they occupy in the tire, the rest of the tire material being omitted.
Figure 3:
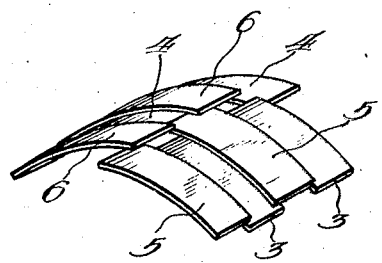
Fig. 3 is a perspective view, on a somewhat smaller scale than Fig. 2, of a short section of the plates in the positions occupied by them in the tire.

In carrying out my invention I make use of four groups of plates of any suitable tough material, preferably resilient metal, and having any desired shape, a convenient shape being rectangular. Each plate is made somewhat more than half as long as the width of the tread portion of the tire to be protected. Consequently if two plates are placed end to end so as to lie transverse of the tire, that is with their major axes in the plane containing the axis of the tire, they will constitute a protecting shield extending across that portion of the tire in which a puncture is apt to occur. By overlapping the plates slightly at their meeting ends an open joint at the very middle of the tire through which a nail or other thing could penetrate is avoided. The plates are laid in two separated groups symmetrically disposed with respect to a central plane at right angles to the axis of the tire, the plates in each group being spaced apart and the plates in each pair of groups being staggered so that those in one group will overlie the spaces between those in the other group.

By means of the arrangement just described it will be seen that while no object can pass through the wall of the tire at any point along the circumferential center line of the tread without engaging the protecting plates, there is no continuity of metal in this region because the major portion of each plate lies wholly on one side of a plane containing this center line. Consequently the tire can be flexed at the center of the tread without producing a corresponding flexing of a single continuous piece of metal, the flexing of the metal being divided between pieces arranged end to end and not joined together at their meeting ends. The result is that the tire is left more flexible than if the metal extended in continuous pieces from one side of the tread to the other and, since the amount of flexing of any single piece is much less than in the case of a long piece extending entirely across the tread, the danger of breakage due to bending back and forth of the metal is reduced to a minimum.

My invention may be applied in various ways. In the arrangement shown in the drawings, it is incorporated directly into the body of a tire casing. Referring to the drawing, 1 represents a tire casing of any usual or suitable construction having an inner wall which preferably takes the form of a crescent-shaped body 2 of rubber thickest at the tread. The part 2 preferably though not necessarily covers the entire inner surface of the casing so that the casing presents a rubber surface for contact with the inner tube. The reinforcing plates are imbedded in the thickened portion of the member 2 lying just within the tread section of the casing. The plates in the four groups are numbered 3, 4, 5 and 6 respectively. The plates 3 lie nearest the inner surface of the member 2, mainly on the right hand side of a plane passing through the center of the tire and at right angles to the axis of the tire, the ends of the plates passing only a short distance beyond this plane; and they are spaced apart a distance somewhat less than their widths. The plates 4 are arranged on the opposite side of the said plane, one end of each extending past said plane a short distance so as to overlap the adjacent ends of the plates 3. The plates 4 are spaced apart in the same way as the plates 3 but are placed in staggered relation to the latter so that each lies opposite a space between two of the plates 3. The plates 5 are arranged on the same side of the tire as the plates 3 but nearer the outer surface of the tire, the plates 5 being staggered with respect to the plates 3 so that they overlie the spaces between the latter plates. The plates 6 occupy the same positions with respect to the plates 4 as do the plates 5 with respect to the plates 3.

It will thus be seen that the member 2 constitutes a liner for a casing, which liner has imbedded therein a yieldable protecting armor which will prevent sharp objects from piercing the liner. The liner is preferably, though not necessarily incorporated in the casing as a part thereof, thereby avoiding the necessity on the part of the user of assembling three elements, namely a casing, an inner tube and a liner instead of simply a casing and an inner tube as in the ordinary tire construction. Furthermore, when the liner forms part of the casing it affords the latter an inner surface of rubber for contact with the inner tube, thus making the casing less liable to crack around the interior and also reducing the friction between the casing and the inner tube.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A cushioning member having imbedded therein a set of two groups of plates each arranged in a row and spaced apart from each other, the plates of one group overlying and completely covering the spaces between the plates of the other group, and a second set of two groups of plates similar to the other groups, the two sets lying on opposite sides of a center line and the plates of each set extending a short distance past said center line so as to overlap the adjacent ends of the plates of the other set.

2. A cushioning member having imbedded therein a set of two groups of plates each arranged in a row and spaced apart from each other, the plates of one group overlying and completely covering the spaces between the plates of the other group, and a second set of two groups of plates similar to the other groups, the two sets lying on opposite sides of a center line and the plates of each set extending a short distance past said center line so as to overlap the adjacent ends of the plates of the other set, each plate being separated from the remaining plates by the material of said cushioning member.

3. A liner for a tire having imbedded therein a set of two groups of plates each arranged in a row extending lengthwise of the liner and spaced apart from each other, the plates of one group overlying and completely covering the spaces between the plates of the other group, and a second set of two groups of plates similar to the other groups, the two sets lying on opposite sides of and being symmetrically disposed with respect to the longitudinal center line, and the plates of each set extending a short distance past said center line to overlap the adjacent ends of the plates of the other set, said plates being made of resilient metal each approximately half as long as the width of the tread surface of a tire and of a width considerably less than the length thereof, said plates being so disposed that their long axes are approximately at right angles to said longitudinal center line.

In testimony whereof, I sign this specification.

EDWARD J. MORAN.